United States Patent [19]

Kanai

[11] Patent Number: 5,007,611
[45] Date of Patent: Apr. 16, 1991

[54] OPERATION MECHANISM OF LIFTER FOR AUTOMOTIVE SEAT

[75] Inventor: Shigeru Kanai, Tokyo, Japan
[73] Assignee: Tachi-S Co. Ltd., Tokyo, Japan
[21] Appl. No.: 461,086
[22] Filed: Jan. 4, 1990
[51] Int. Cl.$^5$ .............................................. B60N 1/02
[52] U.S. Cl. .................................. 248/422; 248/421; 248/419
[58] Field of Search ............... 248/422, 419, 421, 423, 248/394, 396; 74/157; 192/43.1; 297/345

[56] References Cited

U.S. PATENT DOCUMENTS

| | | | |
|---|---|---|---|
| 580,272 | 4/1897 | Gowen | 74/157 |
| 4,274,311 | 6/1981 | Ebert | 192/43.1 X |
| 4,834,333 | 5/1989 | Saito et al. | 248/422 X |
| 4,903,931 | 2/1990 | Shimazaki | 248/422 X |

Primary Examiner—Alvin C. Chin-Shue
Attorney, Agent, or Firm—Oldham & Oldham Co.

[57] ABSTRACT

An operation mechanism of a lifter for an automotive seat, including a drive mechanism, a drive shaft operatively connected with the drive mechanism, a gear fixed on the drive shaft, a pair of first and second latch pawls engageable with the gear, and a switch-over cam for selectively disengaging one of the two latch pawls from the gear, with the other of them remaining in engagement with the gear, which forms a ratchet structure. Such actuation of the switch-over cam is effected by drawing out or retracting the handle of lever provided with the mechanism. Thus, the rotational direction of the gear is set by drawing out or retracting the handle, which causes raising or lowering of the seat through the drive mechanism.

6 Claims, 2 Drawing Sheets

OPERATION MECHANISM OF LIFTER FOR AUTOMOTIVE SEAT

BACKGROUND OF THE INVENTION

1. Field of the Invention

The present invention relates to a lifter for adjustably raising or lowering a seat of automobile, and is particularly directed to a drive and operation mechanisms of the lifter.

2. Description of the Prior Art

A variety of lifters have been invented and used for automotive seats, and most of them are actuated by rotation of an operation lever to raise and lower the seat cushion of the seat. For example, known is the lifter disclosed in the Japanese Laid-Open Patent Publication No. 57-37030. This prior art is of such construction that, when in use, the operation lever is drawn out of a housing for increasing its length and then vertically rotated for causing the vertical displacement of the seat cushion. Therefore, the lifter operation is effected easily by applying a small force upon such extended operation lever. According to the prior art, however, the housing and operation lever are formed in a mutually integral reation, and in particular, the housing is directly connected to a drive shaft in spline connecting manner, the drive shaft being adapted or imparting a rotational force applied on the operation lever to a drive mechanism so as to adjustably move the seat frame in a vertical direction. Consequently, for raising the seat at a highest lever, the operation lever needs to be rotated at over 45 degrees, or rather, as the case may be, it needs to be rotated at over 180 degrees, and an undesired, abnormal rotational angle is required for the operation lever. In that case, further, since the operation lever is disposed at the lateral side of the seat cushion and adjacent to the floor of automobile, the rotation range of the lever is limited within at most 180 degrees and thus can never be rotated around at 360 degrees.

In general, an ideal rotation range of the operation lever for this kind of lifter is approx. 45 degrees above and below a non-use horizontal position of the lever, which is a most comfortable design for operation of the lever at the side of an occupant on the seat, who is to operate the lever with his or her seating posture.

Certainly, the prior art suggests the extendability of the operation lever and provision of springs for helping to give a drive force towards the link members, in order to reduce an operation force required to rotate the drive shaft and associated mechanisms. But, the structure results in a rather complicated mechanism and remains to leave such undesired rotation range problem associated with the operation lever.

SUMMARY OF THE INVENTION

With the above drawbacks in view, it is a first purpose of the present invention to provide an improved operation mechanism for a seat lifter used in an automotive seat, which permits far-improved ease of operating the adjustment of the height of the seat.

In accomplishment of such purpose, the present invention comprises a housing body, an extendable operation lever which is slidably attached to the housing body such as to enable its drawing out and back from the housing body, an arm whose one end is connected to the operation lever, a switch-over cam rotatably2 fixed in the housing, a pair of first and second latch pawls, a gear with which is to be engaged one of the first and second latch pawls through the switch-over cam, and a drive shaft fixed with the gear, the drive shart being operatively connected with a drive mechanism for raising and lowering the seat.

Accordingly, in accordance with the present invention, drawing out and back the operation lever causes the switch-over cam to disengage one of the first and second latch pawls form the gear, while the other of the two pawls is left engaged with the gear, to thereby only permit the gear to rotate in one direction, which therefore causes the same rotation of the drive shaft, determining the raising or lowering of the seat. As such, an occupant on the seat can easily make a selective adjustment, with his or her one hand, with regard to the raising and lowering the seat, simply by drawing out and back the lever and rotating the same upwardly and downwardly.

It is a second purpose of the present invention to provide the foregoing seat-lifter mechanism which permits the occupant to operate it with a small force.

To attain such purpose, in accordance with the present invention, it is so arranged that the drawing out the operation lever, that is, extending longer the lever, causes the switch-over cam to actuate the first and second latch pawls so as to determine the rotational direction of the gear and drive shaft which is to raise the seat through the drive mechanism. Such extension of the lever makes greater the radius of a circle along which the lever is rotated, thereby displaying a leverage effect upon the rotation of the drive shaft, and requiring a far smaller force on the operator's side. Then, the operation of the mechanism for raising the seat, which normally receives an exceptionally great force from the operator, is made smooth with a small force.

In another aspect of the present invention, with the above-described ratchect-type structure, the rotation range of the operation lever may fall within an optimum 45 degrees, upwardly or downwardly, in relation to the normal horizontal position. Thus, in contrast to the previously discussed prior-art lifter mechanism, the lever have only to be rotated repeatedly with such 45-degree rotation range to raise or lower the seat at a desired, unlimited level. This also contributes to the improvement of the operation-ability of the lifter mechanism.

DETAILED DESCRIPTION OF PREFERRED EMBODIMENT OF THE INVENTION

Figure 1:
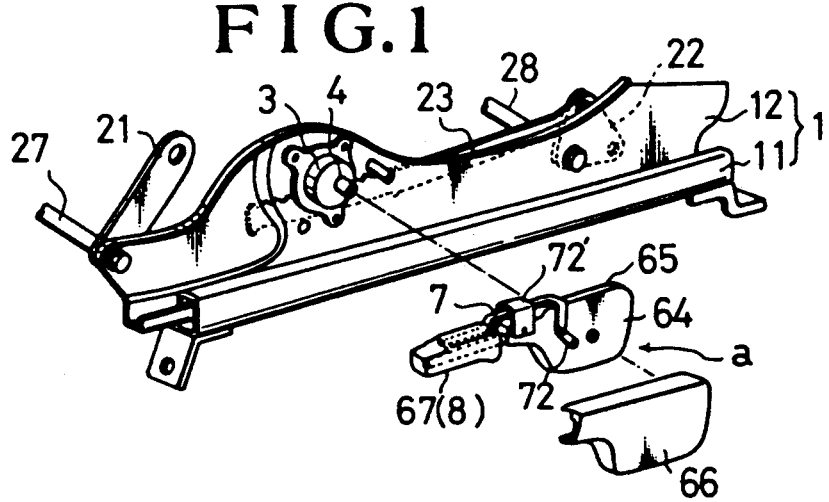
FIG. 1 is a partially broken perspective view of a slid rail to which is mounted an operation mechanism of lifer in accordance with the present invention.

FIG. 1 is a partially broken perspective view which shows the state wherein a mechanism (a) of a seat lifter in accordance with the present invention is mounted on the bracket (12') integral with an upper rail (12) of a slide rail (1). The slide rail (1) comprises the upper rail (12) and a lower rail (11) such the upper rail (12) is slidably fitted in the lower rail (11) so as to be movable thereupon in the longitudinal direction thereof. The bracket (12'), as shown, is formed with the upper rail in a manner expending upwardly, and connected with the a seat frame (2) (see FIG. 2) via front and rearward connecting rods (27)(28) as well as forward and rearward link members (21)(22).

Through the forward end part of the bracket (12'), there passes a drive shaft (4) in a rotatable manner. The outer shaft end part of the drive shaft (4), which is disposed externally of the bracket (12'), is operatively connected with the non-reversible brake device (3) and passes therethrough to further be connected with the mechanism (a). Although not shown, the inner shaft end part of the drive shaft (4), which is diposed internally of the bracket (12'), is connected with a drive mechanism to be stated later, which is adapted for effecting the vertical movement of the seat frame (2).

Designations (64)(65) represent generally a unit of housing and respectively denote a housing lid and a housing bese plate. The housing lid (64) is formed with a peripheral flange which circumscribes the contour of the lid (64) and is to be secured to the housing base plate, thereby defining a container in which are mounted several elements to be set forth later.

Designation (66) denotes a cover which covers such unit of housing (64)(65) from the outside.

In brief, upon the housing base plate (65), are mounted a pair of first and second locking pawls (61)(62), a gear (5), a switch-over cam (63), and arm (7) having associated parts (71, 72, 73...) and an operation lever (8) including a handle (67) and a support guide rod (68), as will be explained in detail later.

It is noted here that, as can be seen from the drawings, the mechanism (a) in the present invention is based on a ratchet structure using the combination of the gear (5) and two locking pawls (61)(62).

Specifically, the mechanism (a) for seat lifter includes a pinion gear (26) fixed with the inner shaft part of the drive shaft (4), a connecting rod (23) having, formed at the forward upper edge area thereof, and a rack gear (24) which is in mesh with the pinion gear (26). The rearward end of the connecting rod (23) is operatively connected with the rearward link member (22). As shown, the forward lower edge area of the connecting rod (23), opposite to its foregoing forward upper edge area, is supported upon a roller (25) in such a manner as to be movable on the same, the roller (25) being provided rotatably on the bracket (12'). The rearward end part of the rearward link member (22) is connected with the one end of the rearward connecting rod (28) which, although not shown, extends between a pair of the brackets (12') in a free-to-rotate manner. The forward link member (21) is rotatably connected to the one end of the front connecting rod which extends between a pair of the brackets (12') though not shown.

Accordingly, as will become more apparent, with the operation of the mechanism (a), the drive shaft (4) is caused to rotate, which in turns causes the rotation of the pinion gear (26). Such rotation of the pinion gear (26) effects the fore-and-aft movement of the rack gear (24) in the longitudinal direction of the seat, to thereby translate the connecting rod (23) forewardly or backwardly, which results in the vertical motions of the links (21)(22) for raising or lowering the seat frame (2). In the illustrated embodiment, as can be seen from FIGS. 1 and 2, the clockwise rotation of the drive shaft (4) causes the same rotation of the pinion gear (26), thus moving the connecting rod (23) forwardly so as to lower the two links (21)(22), and thus the seat frame (2), while on the other hand, the counterclockwise rotation of the drive shaft (4) of the drive shaft (4) causes backward movement of the connecting rod (23) to upstand the two links (21)(22), thus raising the seat frame (2).

Figure 3:
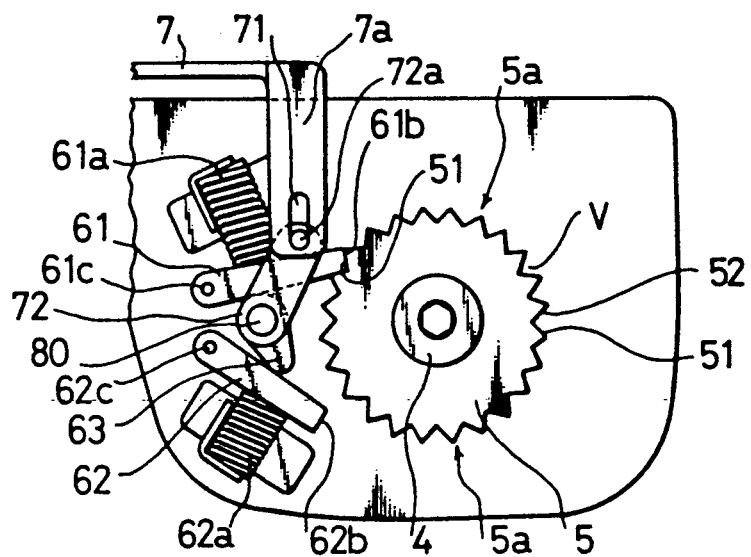
FIG. 3 is a partially enlarged view showing one of the principal parts of the invention.

Referring now to FIG. 3, a more specific description will be made of one of the principal part of the mechanism (a). This figure shows the interior of the housing unit (64)(65) and state wherein the housing lid (64) is removed from the counterpart (65). Hereinafter, as in FIGS. 4 and 5, the mechanism (a) will be described, with its housing lid (64) removed therefrom. It should however be understood that the arm (7) is so formed as to extend along the contour of housing unit (64)(65) as can be seen from FIG. 1; namely, the arm (7) extends above the upper flange area of the housing lid (64) in its longitudinal direction, and has a downwardly curved leg (7a) which is bent generally at a right angle from the rearward end of the arm (7) and further bent downwardly and generally perpendicularly to form such leg (7a). The leg (7a) is dependent along yet spaced from the outer wall of the housing lid (64). The end part of the leg (7a) of the arm (7) is formed with a vertically elongated hole (71). Into the hole (71), is slidably inserted a projecting pin (72a) which erects integrally from the upper end part of a link member (72). The lower end part of the link member (72) is fixed on a shaft (80) which extends across the housing base plate (65) and lid (64) and is supported rotatably therebetween. Upon that shaft (80), is further fixed the base end part of a switch-over cam (63), whereupon the link member (72) and switch-over cam (63) are fixed on the same rotation center at (80) to allow simultaneous rotation of both link member (72) and cam (63) about the axis of that rotation center.

Designation (72') denotes an inverted U-shaped guide support member fixed at the forward part of the housing unit (64)(65) and bridges over the arm (7) so as to act as a guide for the arm (7) to move forwardly and backwardly therethrough.

The forward end portion of the arm (7) is embedded integrally in the handle (67) of the operation lever (8).

The handle (67) has a bore (8a) formed at its rearward end side, which extends therein in the longitudinal direction thereof and terminates at the forward end point( in the handle (67). Inserted slidably in that bore (8a) is the support guide rod (68) extended from the housing unit (64)(65).

Symmetrically relative to and on the opposite sides of the support pin (65a), are arranged a pair of first and second latch pawls (61)(62) in such a manner that the two latch pawls (61)(62) are at their respective base end parts rotatably pivoted by means of first and second pins (61c)(62c) fast on the base plate (65), and that the respective forward ends (61b) (62b) of the two pawls (61)(62) are directed towards the teeth (5a) of the gear (5). The first latch pawl (61) is biased by a first spring (61a) downwardly into engagement with one of the valleys (v) of the gear (5), whereas the second latch pawl (62) is biased by a second spring (62a) upwardly into engagement with one of the valleys (v) of the gear (5).

The gear (5) is freely journalled in the housing unit (65) via the drive shaft (4) to which is firmly connected the gear (5) so that the housing unit (64) (65) per se is free to rotate about the drive shaft (80). The gear (5) is connected to the drive shaft (4) in a spline connecting way. As best shown in FIG. 3, the gear (50) has plural teeth (5a) which are each preferably formed with a valley (v) having 90-degree angle assumed in relation to the opposed sides (51)(52) of the teeth (5a).

Preferably, the forward ends (61b)(62b) respectively of the two pawls (61)(62) are formed flat such that the corners of the ends (61b)(62b) assume relative right-angle relation, in order for either of the ends (61b)(62b) to engage fit in the 90-degree angled valley (v) of the gear (5), whereby the flat extremity surfaces of the ends (61b)(62b) are abutted completely against their mating sides (51)(52) of the teeth (5a) of the gear (5). This ensures a complete engagement between the latch pawl (61 or 62) and one of the teeth (5a) of the gear (5), thus enhancing the reliability in causing the rotation of the gear (5) as well as in placing the gear (5) in a locked state against the reverse rotation thereof.

The switch-over cam (63) is interposed between first and second latch pawls (61)(62), and adapted to release one of the first and second latch pawls (61)(62) from engagement with the gear (5), to thereby leave the other of two pawls (61)(62) in engagement with the gear (5), so as to permit selection between the clockwise rotation and counterclockwise rotation with regard to the rotational direction of the gear (5). Specifically, if the free end of the switch-over cam (63) is abutted against the second latch pawl (62) as in FIG. 3, to press downwardly the second latch pawl (62) away from the gear (5), the first latch pawl (61) is left urged into engagement with the gear (5) by the downward biasing force of the first spring (61a), whereupon, when the operation lever (8) is rotated upwardly relative to the central axis of the drive shaft (4) which forms the rotation center of the lever (8) as well as the mechanism (a), the first latch pawl (61) is also displaced rotatively about the drive shaft (4) in an upward direction, to thereby pressingly rotate the gear (5) in a clockwise direction, as indicated by the arrow in FIG. 4. Hence, if, reversely, the free end of the switch-over cam (63) is abutted against the first latch pawl (62), as in FIG. 5, to press upwardly the first latch pawl (62) away from the gear (5), then the second latch pawl (62) is left urged into engagement with the gear (5) by the upward biasing force of the second spring (62a), and accordingly the downward rotation of the lever (8) causes the second latch pawl (62) to be displaced rotatively relative to the drive shaft (4), thereby pressingly rotating the gear (5) in a counterclockwise direction, as indicated by the arrow in FIG. 5.

Now, referring to FIGS. 4 and 5, a description will be given of an operation of the above-constructed mechanism (a).

Figure 4:
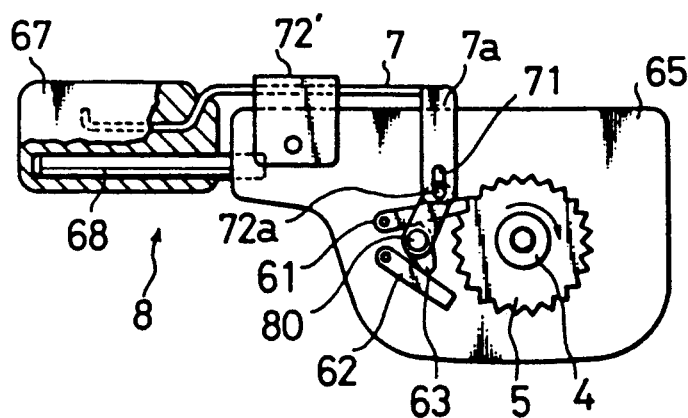
FIG. 4 is a partially broken elevation view of the operation mechanism, which shows the state wherein the operation lever thereof is drawn back, or retracted.

FIG. 4 shows the state wherein the handle (57) is drawn back to or retracted adjacent the forward end of the housing base plate (67). Under such state, the leg (7a) of the arm (7) is displaced at a point rearwardly of the housing base plate (65) and thus the free forward end of the cam (63) is oriented toward and abutted against the second latch pawl (62). Hence. the second pawl (62) is thereby pressed and rotated downwardly about the pin (62c) in a sense to be disengaged out of the gear (5), with the result that the other first latch pawl (62) is left urged into engagement with the gear (5), or more specifically the forward end (62b) of the second latch pawl (62) stands in abutment against the side surface (520 of the valley (v) of the gear (5). Consequently, the gear (5) is only permitted to rotate in the clockwise direction. In other words, with this condition, it is to be understood that the mechanism (a) is to be rotated generally between the shown horizontal normal position and a downwardly inclined position (not shown) in a repeated manner. Owing to the ratchet structure, when the operation lever (8) is rotated downwardly, the two latch pawls (61)(62) are displaced rotatively in a counterclockwise direction relative to the shaft (4), with the forward end of the first pawl (61) riding over a certain series of the teeth (5a) of the gear (5), whereas by contrast, when the lever (8) is rotated upwardly to the horizontal normal position, the first latch pawl (61) comes to a complete engagement with the valley (v) of the gear (5) as can best be seen from FIG. 3, and with the upward rotative displacement of the first latch pawl (61), the gear (5) is caused to rotate in the clockwise direction as indicated by the arrow. The clockwise rotation of the gear (5) causes the rotation of the pinion gear (26) via the drive shaft (4) in the same direction, thereby moving the connecting rod (23) forwardly relative to the seat (S) so as to rotate the two links (21)(22) further forwardly, as viewed from FIG. 2, as a result of which the seat frame (2) is lowered. In that way, a repeated rounds of up-and-down rotations of the lever (8) generally between the normal horizontal and downwardly inclined positions results in lowering the seat frame (2) in an adjustable manner.

Figure 2:
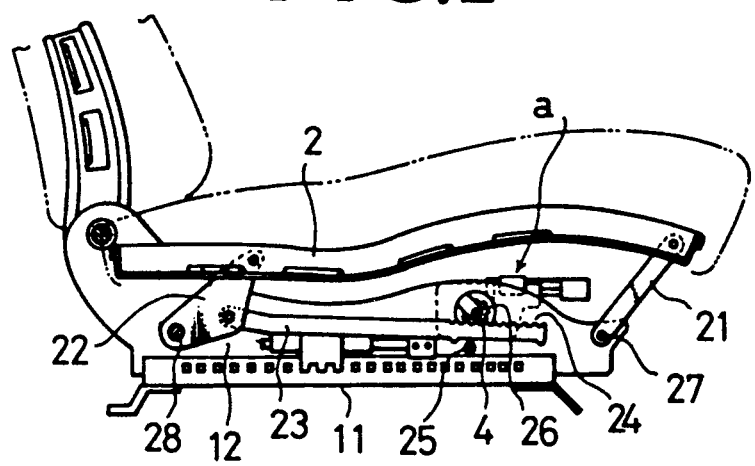
FIG. 2 is a side view of a seat framework provided with a drive mechanism as well as the operation mechanism for the lifter.
Figure 5:
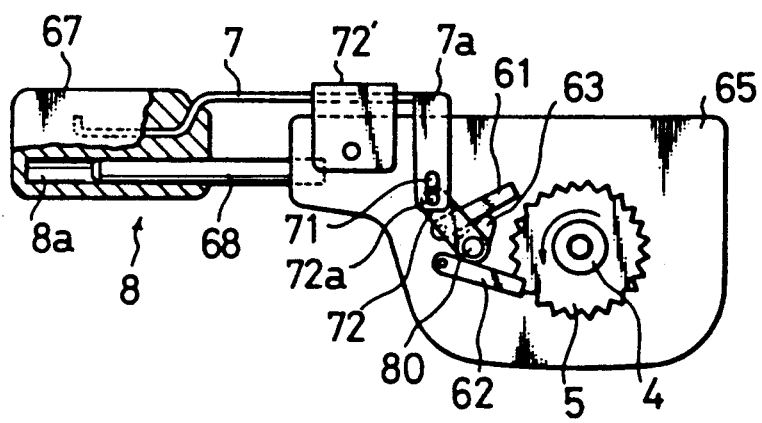
FIG. 5 is a partially broken elevation view of the operation mechanism, which shows the state wherein the operation lever thereof is drawn out, or extended.

FIG. 5 shows the state wherein the handle (7) is drawn forwardly from the forward end of the housing base plate (65). in this case, the leg (7a) of the arm (7) is displaced at the point forwardly of the housing base plate (65). In contrast to the foregoing retracted state, the switch-over cam (63) is directed towards the first latch pawl (61), pressing the same upwardly away from the gear (5), while the second latch pawl (62) is left urged into engagement with the gear (5) by the upwardly biasing force of the first spring (61a), or stated precisely, its forward end (62b) stands in abutment against the side surface (52) of the valley (v) of the gear (5). Consequently, the gear (5) is then only permitted to rotate in the counterclockwise direction. In other words, with this condition, the mechanism (a) is to be rotated generally between the shown horizontal normal and an upwardly inclined position (not shown), in a repeated manner. Owing to the ratchet structure, when the operation lever (8) is rotated upwardly, the second latch pawl (62) is displaced upwards rotatively relative to the shaft (4), riding over a certain series of the teeth (5a) of the gear (5), while by contrast, when the lever (8) is rotated downwardly back to the normal horizontal position, the second pawl (62) comes to a complete engagement with the valley (v) of the gear (5), and with downward rotative displacement of that pawl (62), the gear (5) is caused to rotate in the counterclockwise direction as indicated by the arrow. Such counterclockwise rotation of the gear (5) causes rotation of the pinion gear (26) via the drive shaft (40) in the same direction, thereby moving the connecting rod (23) backwardly relative to the seat (S) so as to rotate the two links (21)(22) backwardly from the forwardly inclined state as shown in FIG. 2, with the result that the seat frame (2) is raised. Hence, a repeated rounds of up-and-down rotations of the lever (8) generally between the normal horizontal and upwardly inclined positions results in raising the seat frame (2) in an adjustable manner.

It is to be noted that, with the above structure, the rotational operation of the seat lifter mechanism (a) can be effected within approx. 45 degrees in upward or downward direction from the normal horizontal position, which is ideal for the ease with which the operation lever (8) is operated.

From the descriptions above, it is appreciated that (i) an operator may not only operate the mechanism (a) easily but also switch over the rotational direction of the gear (5) for selecting one of the raising and lowering adjustments of the seat frame (2), with his or her one single hand, by simply drawing out or back the lever handle (67) from the mechanism body (a), (ii) the operation lever (8) can be rotated within 45 degrees upwardly and downwardly from its normal horizontal position, which enhances easy operationability of the seat height adjustment and reduces a labor feeling on the operator's part, and (iii) when raising the seat frame (2), the handle (67) is drawn out from the mechanism body (a) so as to render greater the length of the lever (8) per se, which realizes an increased leverage effect to reduce a relatively great force required for the operator to raise the links (21)(22) from the forwardly inclined state through the mechanism (a).

While having described the present invention as above, it should be understood that the invention is not limited to the illustrated embodiment but other various modifications, replacements and additions may structurally be possible without departing from the spirits and scopes of the appended claims. For example, the switch-over cam (63) and the links (21)(22) may be modified in a manner opposed to the above-described embodiment; namely, the links (21) (22) may be formed in a backwardly inclined state as opposed to the forwardly inclined state of the same shown in FIG. 2, and the cam (63) may be constructed with other suitable mechanical elements so that the drawing-out of the handle (57) as in FIG. 5 actuates the cam to push and disengage the first latch pawl (61) from the gear (5), thus permitting seat-frame raising adjustment to be effected by a repeated rotations of the lever (8) between the normal horizontal and upwardly inclined positions, whereas the retracting of the handle (57) as in FIG. 4, then, actuates the cam (63) to pressingly disengage the second latch pawl (61) from the gear (5), permitting seat-frame lowering adjustment to be effected by repeated rotations of the handle (57) between the normal horizontal and downwardly inclined positions.

What is claimed is:

1. An operation mechanism of a lifter for an automotive seat, comprising:
   a drive mechanism for raising and lowering a seat frame of said seat;
   a drive shaft connected with said drive mechanism;
   a gear fixed on said drive shaft;
   a housing which is rotatably supported on said drive shaft, said housing has an operation lever connected integrally therewith;
   a pair of first and second latch pawls provided within said housing in such a manner that said first latch pawl is to be engaged with one side of said gear so as to permit said gear to rotate only in a one direction, and said second latch pawl is to be engaged with the other side of said gear so as to permit said gear to rotate only in a direction opposite to said one direction;
   a cam means fixed on a shaft which is rotatably secured within said housing an arm, having a dependent leg, which is so arranged that its one end is operatively connected with said cam means whereas its other end extends towards said operation lever, and wherein there is provided a link means between said arm and said cam such that one end of said link means is fixed on said shaft while the other end of said link means is pivotally connected with said one end of said arm, whereby forward and backward movement of said arm causes said link means to rotate in same direction about said shaft, which causes rotation of said cam means by said shaft to disengage one of said first and second latch pawls from said gear, with the other of them remaining in engagement with said gear;
   an arm which is so arranged that its one end is operatively connected with said cam means whereas its the other end that extends towards said operation lever;
   wherein said operation lever includes a support rod and a handle attached slidably on said support rod, such that said handle is movable along said support rod in a longitudinal direction thereof, and wherein, to said handle is connected said the other end of said arm, whereby drawing forwards and backwards said handle along said longitudinal direction of said operation lever results in actuating said cam by said arm to thereby selectively disengage one of said first and second latch pawls from said gear, and set a rotational direction of said gear to actuate said drive mechanism to effect desired one of raising and lowering motions of said seat frame.

2. The operation mechanism is defined in claim 1, wherein said support rod of said operation lever is at its one end fixed to said housing.

3. The operation mechanism as defined in claim 1, wherein said mechanism is so constructed that drawing said handle in a direction away from said housing actuates said cam means to disengage one of said first and second latch pawls from said gear while engaging the other of them with said gear in order for said gear to be rotated in a direction to effect raising of said seat frame.

4. The operation mechanism as defined in claim 1, wherein there are provided a pair of springs which are respectively adapted for urging said first and second latch pawls into engagement with said gear, and wherein one of said first and second latch pawls is disengaged by said cam means against a biasing force of one of said springs, with the other of said two latch pawls remaining urged into engagement with said gear.

5. The operation mechanism as defined in claim 1, wherein said gear has plural teeth whose valleys each assume 90-degree angle.

6. The operation mechanism as defined in claim 1, wherein horizontal movement of the handle is imparted to the arm and its dependent leg to the link member, to thereby transform such horizontal motion into a horizontal rotational motion at the link member, shaft, so as to cause rotation of the cam.

* * * * *